United States Patent [19]

Nagaraj

[11] Patent Number: 5,754,069
[45] Date of Patent: May 19, 1998

[54] MECHANISM FOR AUTOMATICALLY ENABLING AND DISABLING CLOCK SIGNALS

[75] Inventor: Raviprakash Nagaraj, Hillsboro, Oreg.

[73] Assignee: Intel Corporation, Santa Clara, Calif.

[21] Appl. No.: 644,178

[22] Filed: May 10, 1996

[51] Int. Cl.$^6$ .......................... H03K 17/22; H03K 17/28; G06F 1/10
[52] U.S. Cl. .......................... 327/198; 327/142; 327/291; 327/365; 327/594; 364/707; 395/750.06
[58] Field of Search .................. 327/18, 21, 291, 327/544, 31, 77, 78, 87, 142, 198, 594, 293, 108, 20, 99, 403, 415, 365, 295; 364/707; 395/750.06, 750.04, 560

[56] References Cited

U.S. PATENT DOCUMENTS

| | | | |
|---|---|---|---|
| 4,583,013 | 4/1986 | Gupta | 327/18 |
| 4,637,018 | 1/1987 | Flora et al. | 327/99 |
| 4,855,616 | 8/1989 | Wang et al. | 327/99 |
| 5,371,417 | 12/1994 | Mirov et al. | 327/40 |
| 5,428,765 | 6/1995 | Moore | 327/292 |
| 5,452,434 | 9/1995 | MacDonald | 395/560 |
| 5,461,652 | 10/1995 | Hongo | 395/750.04 |
| 5,603,037 | 2/1997 | Aybay | 395/750.04 |
| 5,625,807 | 4/1997 | Lee et al. | 395/560 |

*Primary Examiner*—Margaret Rose Wambach
*Assistant Examiner*—Terry L. Englund
*Attorney, Agent, or Firm*—Blakely, Sokoloff, Taylor & Zafman

[57] ABSTRACT

A mechanism for automatically enabling and disabling clock signals includes a driver for providing a clock signal as an output, a gate coupled to the driver, and a sensing circuit coupled to both the output of the driver and to the gate. The sensing circuit provides a signal to the gate responsive to the output being in a first state. The gate then prevents the driver from driving the clock signal responsive to the signal from the sensing circuit. In one embodiment, a generator is coupled to the driver for providing a waveform to the driver. The driver then provides the clock signal based on this input waveform. Additionally, the gate is situated between the generator and the driver. The gate, based on the output of the sensing circuit, can then prevent the waveform from being provided to the driver.

15 Claims, 5 Drawing Sheets

MECHANISM FOR AUTOMATICALLY ENABLING AND DISABLING CLOCK SIGNALS

BACKGROUND OF THE INVENTION

1. Field of the Invention

The present invention pertains to the field of generating and providing clock signals. More particularly, this invention relates to automatically enabling and disabling clock signals.

2. Background

Modern computer systems include multiple components which are controlled by a periodic signal, typically referred to as a clock signal. Current technology often requires that multiple components within a computer system receive clock signals which are synchronized to one another. Typically, one or more integrated circuit (IC) chips in a computer system generate the necessary clock signals at the appropriate frequencies as required by the different components which can be included in the computer system. These different clock signals are then provided to the appropriate components in the system.

Modern computer systems generally need to be able to support a wide range of components, even though a particular system may not always have all of these components. Typically, a clock signal is provided on a clock line for each component which could be included in the system. Although clock signals are necessary in a computer system, their generation is not without consequences. Each active clock signal in a computer system requires energy to be produced, increases the heat generated by the system, and produces electromagnetic interference (EMI) emissions. Therefore, providing a clock signal to each component which could possibly be in the system can result in several problems.

One problem is that some clock signals that are being generated are not being used (that is, the clock signal is being generated for a component which is not in the system). Generating a clock signal which is not used by any component in the system results in unnecessary power consumption and heat generation. Unnecessary power consumption is particularly problematic in portable computer systems because it unnecessarily reduces battery life. Additionally, as many microprocessors generate a great deal of heat, it is problematic to further compound this problem with an unnecessary increase in heat due to an unused clock signal. Thus, it would be beneficial to provide a mechanism which prevents the generation of unused clock signals.

Additionally, generating an unused clock signal results in the generation of unnecessary EMI emissions. In a typical desktop computer, additional shielding can be included within the casing to provide protection from EMI emissions. However, in a portable computer, such shielding adds undesirable weight and space to a relatively small and lightweight product. Thus, it would be beneficial to provide a mechanism which reduces EMI emissions without significantly increasing the weight or size of the computer system.

One straightforward solution to these problems would be to include, on the clock generation IC chip, an additional enable pin for each of the clock signals being generated by the chip. These clock signals could then be enabled or disabled using the corresponding enable pin. However, the additional enable pin increases the pin count for the IC, which increases both the size and the cost of the IC. Thus, it would be beneficial to provide a mechanism which generates only the clock signals necessary for the components which are actually present in the system without requiring individualized enable/disable pins.

As will be described in more detail below, the present invention provides a mechanism for automatically enabling and disabling clock signals that achieves these and other desired results which will be apparent to those skilled in the art from the description to follow.

SUMMARY OF THE INVENTION

A mechanism for automatically enabling and disabling clock signals is described herein. The mechanism includes a driver for providing a clock signal as an output, a gate coupled to the driver, and sensing circuitry coupled to both the output of the driver and to the gate. The sensing circuitry provides a signal to the gate responsive to the output being in a first state. The gate then prevents the driver from driving the clock signal responsive to the signal from the sensing circuitry.

In one embodiment, a generator is coupled to the driver for providing a waveform to the driver. The driver then provides the clock signal based on this input waveform. Additionally, the gate is situated between the generator and the driver. The gate, based on the output of the sensing circuitry, can then prevent the waveform from being provided to the driver.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the descriptions which follow reference is made to logical zeroes and logical ones. A logical zero typically represents a voltage of between 0.0 and 0.5 volts. When a particular signal or node is a logical zero, the signal or node is referred to as being low or in a low state. A logical one typically represents a voltage of between 1.8 and 5.5 volts. When a particular signal or node is a logical one, the signal or node is referred to as being high or in a high state. It is to be appreciated, however, that the voltages which represent a logical zero or a logical one can be different than the ranges mentioned above.

The present invention includes a mechanism for automatically enabling and disabling clock signals, dependent on whether the components which are to receive the clock signals are present in the system. Multiple clock signals can be provided by a clock synthesizer according to the present invention. For each possible clock signal, the present invention automatically senses whether the component to be driven by that particular clock signal is present in the system. If the component is present, then the clock signal is provided to the component. However, if the component is not present, then the clock signal which would be provided to the component if it were present is not generated.

Figure 1:
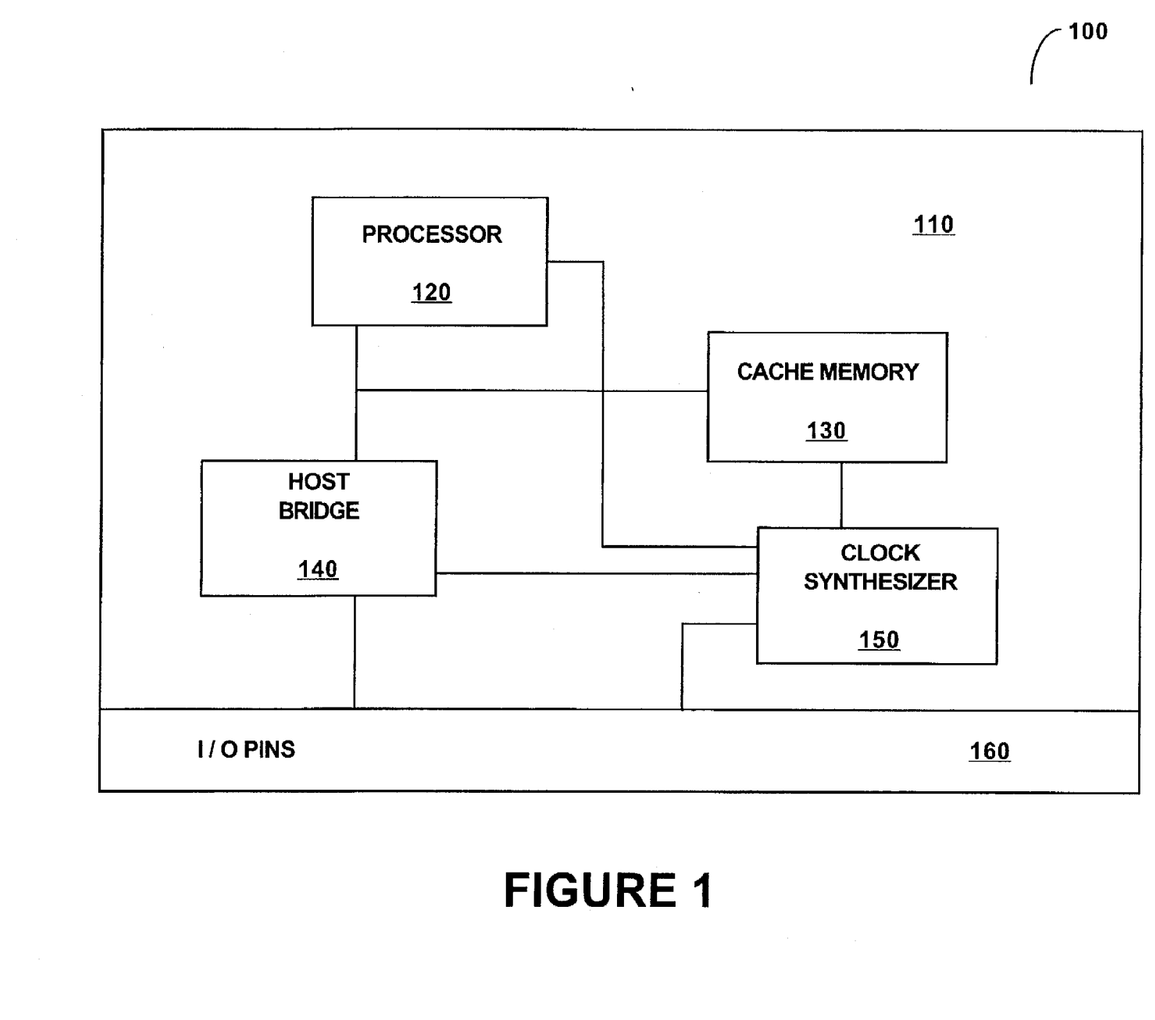
FIG. 1 is a block diagram of a computer system such as may be used with one embodiment of the present invention.

FIG. 1 is a block diagram of a computer system such as may be used with one embodiment of the present invention. A computer system 100 is shown including a circuit board 110, commonly referred to as a processor card. Only one circuit board has been shown so as not to clutter the drawings, however, it is to be appreciated that the system 100 can include multiple circuit boards. Furthermore, additional devices (not shown) may also be coupled to the system 100, such as a display device, an alphanumeric input device, a cursor pointing device, etc.

In one embodiment of the present invention, the computer system 100 is a portable computer system. Portable computer systems are typically designed so that they can be easily carried by the user. Portable computer systems typically, but not necessarily always, have a display device, alphanumeric input device, storage device, and motherboard all incorporated in the same housing. Additionally, portable computer systems typically are capable of operating on either battery power or AC power.

The circuit board 110 includes a processor 120, a cache memory 130, a host bridge 140, a clock synthesizer 150, and input/output (I/O) pins 160, coupled together as shown. The I/O pins 160 provide a physical connection between the circuit board 110 and a motherboard (not shown). The host bridge 140 is a bridge which operates in a conventional manner to transfer address, data and control signals between the components on the circuit board 110 and a motherboard via the I/O pins 160. The processor 120 processes information and instructions, and the cache memory 130 stores information and instructions for the processor 120.

The clock synthesizer 150 is coupled to the components on the circuit board 110 as shown to provide clock signals to the components. The clock synthesizer 150 receives any necessary external inputs via either the I/O pins 160 or additional components (not shown) coupled to the circuit board 110. Additionally, according to one embodiment of the present invention, the clock synthesizer 150 also provides clock signals to other components in the system 100 external to the circuit board 110.

In one embodiment of the present invention, the clock signals generated by the clock synthesizer 150 are the same frequency for each device. Alternatively, different clock signals generated by the clock synthesizer 150 for different components may have different frequencies.

Additional clock signals can also be provided by the clock synthesizer 150 in addition to those shown in FIG. 1. For example, the system 100 may be configured to have the option to include additional components which require a clock signal from the clock synthesizer 150. An additional clock line and clock signal output from the clock synthesizer 150 is included for these additional components, regardless of whether the system 100 actually includes these additional components.

In one embodiment of the present invention, a clock signal output by the clock synthesizer 150 is provided to multiple components. In alternate embodiments, some or all of the clock signals that are output by the clock synthesizer 150 are provided to only one of the multiple components.

Figure 2:
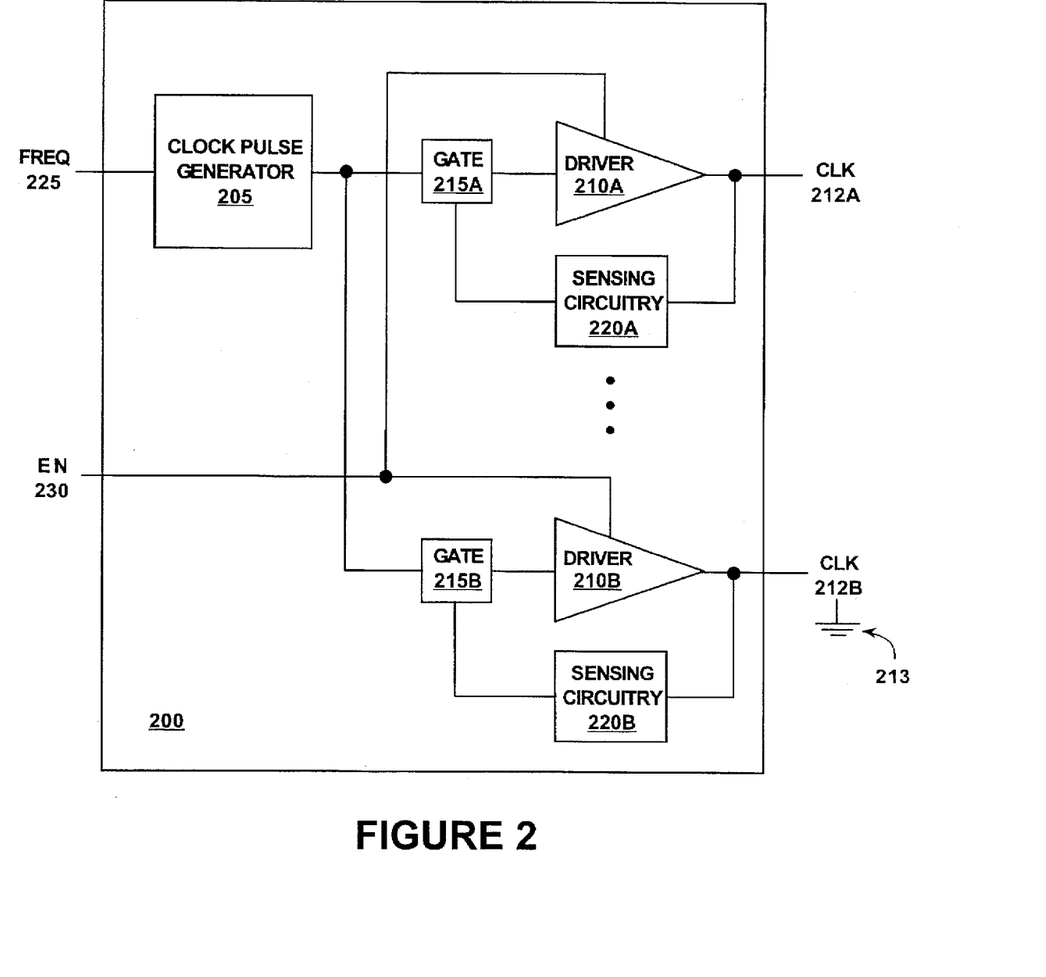
FIG. 2 is a logic diagram of a clock synthesizer according to one embodiment of the present invention.

FIG. 2 is a logic diagram of a clock synthesizer according to one embodiment of the present invention. In one implementation, the clock synthesizer 200 is the clock synthesizer 150 of FIG. 1.

The clock synthesizer 200 includes a clock pulse generator 205, multiple drivers 210a and 210b, multiple oscillation sensing circuits 220a and 220b, and multiple gates 215a and 215b coupled together as shown. An input frequency signal (FREQ) 225 is input to the clock pulse generator 205, and an enable signal (EN) 230 is input to each of the drivers 210a and 210b, as shown.

The input frequency signal 225 is generated external to the clock synthesizer 200. In one embodiment, the frequency signal 225 is generated based on the oscillation of a crystal, however, it is to be appreciated that the frequency signal 225 can be generated in any of a wide variety of conventional manners. In one implementation, the frequency signal 225 has a frequency of 14.31818 Mhz. The generation of a frequency using a crystal is well known to those skilled in the art, and thus will not be discussed further.

The clock pulse generator 205 generates and outputs a clock signal based on the input frequency signal 225. The clock pulse generator 205 generates a conventional waveform having a period which is dependent on the input frequency signal 225. In one implementation, the clock pulse generator 205 generates a square waveform using a conventional voltage controlled oscillator. An additional input (not shown) to the clock pulse generator 205 can be used to change the period of the waveform generated by the clock pulse generator 205. The generation of a waveform is well known to those skilled in the art, and thus will not be discussed further.

A gate, driver, and oscillation sensing circuit are included for each output clock signal which the clock synthesizer 200 can provide. It is to be appreciated that for any particular computer system, all of the output clock signals which the clock synthesizer 200 can provide may or may not be used to actually drive components in the system. For example, a clock synthesizer may be able to provide clock signals to four different components, only three of which may be in a particular system.

The gates, drivers, and oscillation sensing circuitry for two particular output clock signals will be discussed in more detail below. However, it is to be appreciated that these discussions are applicable to each of the output clock signals which can be output by the clock synthesizer 200.

The enable signal 230 is provided as an enable input to each of the drivers 210a and 210b. The enable signal 230 can be manipulated externally to disable all of the drivers 210a and 210b as a group. The enable signal 230 does not allow individual drivers to be selectively enabled or disabled.

The clock pulse generator 205 outputs a waveform to the gate 215a. The gate 215a can be turned either on or off. If the gate 215a is turned on, then the waveform is provided, through the gate 215a, to the driver 210a. However, if the gate 215a were to be turned off, then the waveform would not pass through the gate 215a, and thus would not be provided to the driver 210a. Initially, the gate 215a is turned on. In one embodiment of the present invention, a reset signal (not shown) internal to the chip is generated in response to Vcc rising. This internal reset signal is then used to ensure that the gate 215a is initially turned on.

If the gate 215a is turned on, then the waveform is input to the driver 210a. The driver 210a amplifies the waveform and drives the output clock signal (CLK) 212a. The output clock signal 212a is then provided to one of the components of the computer system, such as processor 120 of FIG. 1. The driver 210a is any of a wide variety of conventional driver devices.

The output clock signal 212a is also input to the oscillation sensing circuitry 220a. The output of the circuitry 220a is input to the gate 215a. In one embodiment, the clock synthesizer 200 includes an additional internal clock signal (not shown) operating at a higher frequency and out of phase with the output clock signal 212a. On the rising edge of the higher frequency clock signal, the sensing circuitry 220a samples the state of the output clock signal 212a. A state machine (not shown) within the sensing circuitry 220a is used to keep track of whether the output clock signal 212a alternates between high and low states as expected for an oscillating clock signal. The sensing circuitry 220a provides a signal in a first state (e.g. a high state) to the gate 215a if the output clock signal 212a is oscillating. However, it should be noted that the sensing of whether the output clock signal is oscillating can be done in any of a wide variety of conventional manners.

The output of the circuitry 220a either turns the gate 215a off or leaves the gate 215a on. If the output clock signal 212a is oscillating, then the circuitry 220a provides a signal in a first state (e.g., a high state) to the gate 215a. This first state leaves the gate 215a on (or would turn the gate 215a on if it were previously turned off). Thus, since the clock signal 212a is oscillating, the gate 215a remains on, and the waveform from the clock pulse generator 205 is input to the driver 210a, which in turn continues to provide the oscillating clock signal 212a. Thus, when the gate 215a is turned on and the enable signal 230 is asserted, the clock signal 212a is enabled.

The clock pulse generator 205 also provides the waveform to the gate 215b. The gate 215b, the driver 210b, and the oscillation sensing circuitry 220b are coupled together to operate analogous to the gate 215a, the driver 210a, and the oscillation sensing circuitry 220a discussed above.

However, the output clock signal 212b is coupled to a ground 213, as shown. In one embodiment, this grounding is done on the board 110 of FIG. 1. For example, if a component is not present in a system 100, then the output clock signal which would be provided to that component is coupled to the ground 213 instead.

Thus, even though the waveform is provided from the clock pulse generator 205 to the driver 210b, the output clock signal 212b is in a low state because the signal 212b is grounded. Thus, the input to the oscillation sensing circuitry 220b is a signal at a constant low state, rather than an oscillating signal as is input to the circuitry 220a discussed above. The circuitry 220b in turn provides a low signal to the gate 215b to turn the gate off, which prevents the waveform from being provided to the driver 210b. Thus, when the gate 215b is turned off, the output clock signal 212b is disabled.

The gates 215a and 215b discussed above can be any of a wide variety of conventional gates. In one embodiment, each gate is a metal oxide semiconductor (MOS) transistor. The gates can be n-channel devices or p-channel devices.

It should be noted that, as discussed above, the enable signal 230 can be used to disable all of the drivers. The disabling of the drivers prevents any output clock signals from being provided by the clock synthesizer 200, regardless of whether the gates 215a and 215b are turned on.

Figure 3:
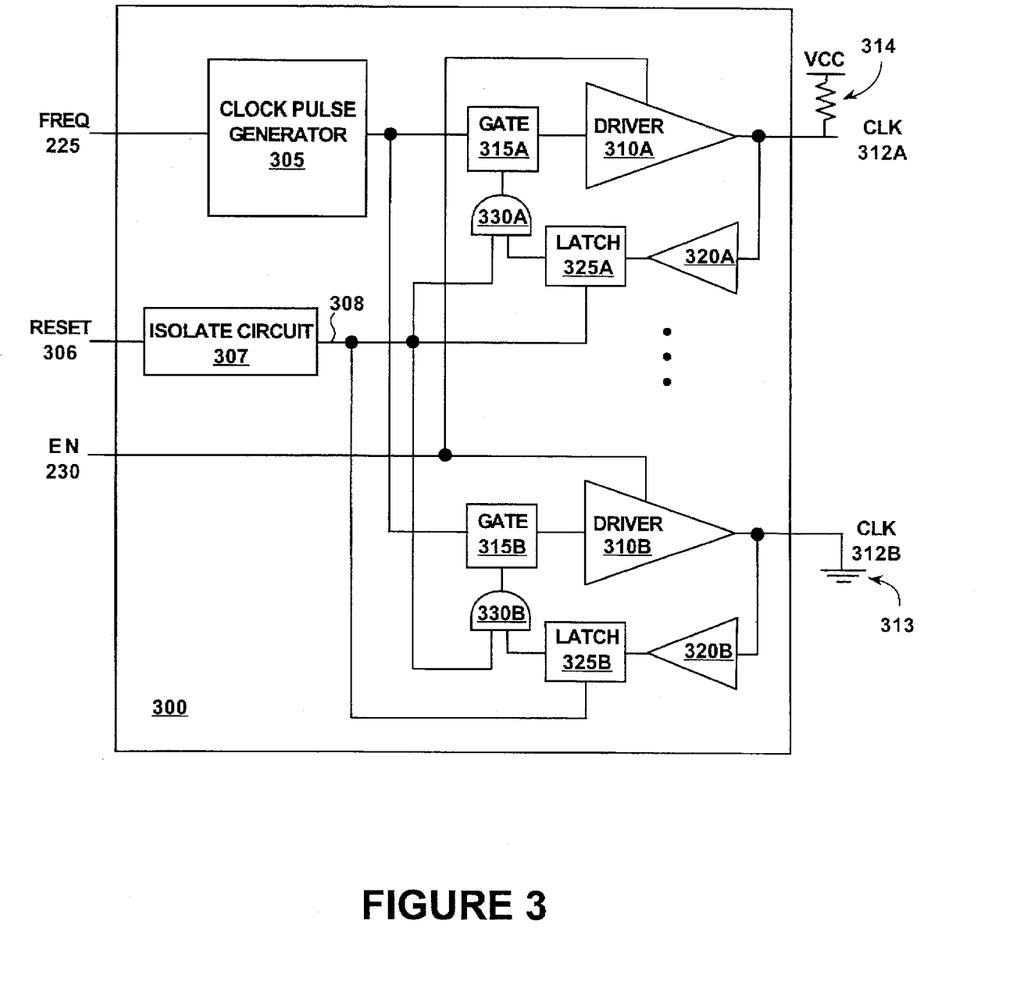
FIG. 3 is a logic diagram of a clock synthesizer according to another embodiment of the present invention.

FIG. 3 is a logic diagram of a clock synthesizer according to another embodiment of the present invention. In one implementation, the clock synthesizer 300 is the clock synthesizer 150 of FIG. 1.

The input frequency signal 225 and the enable signal 230 are input to the clock synthesizer 300 as shown. The clock pulse generator 305 generates and outputs a waveform signal based on the input frequency signal 225 in the same manner as the clock pulse generator 205 discussed above with reference to FIG. 2. The enable signal 230 is used to enable or disable the drivers 310a and 310b as a group in the same manner as discussed above.

The clock synthesizer 300 includes gates 315a and 315b, drivers 310a and 310b, buffers 320a and 320b, latches 325a and 325b, and logical AND devices 330a and 330b, coupled together as shown. A gate, driver, buffer, latch and logical AND device are included for each output clock signal which the clock synthesizer 300 can provide. The gates, drivers, buffers, latches, and logical AND devices for two particular output clock signals will be discussed in more detail below. However, it is to be appreciated that these discussions are applicable to each of the output clock signals which can be output by the clock synthesizer 300.

The clock synthesizer 300 also includes an isolate circuit 307, which receives a reset signal 306. In one embodiment, the reset signal 306 is the system reset signal, which is activated whenever the computer system is powered on. Alternatively, the reset signal 306 could be a separate reset signal which is used to reset only the clock synthesizer 300.

The isolate circuit 307, upon sensing the reset signal 306 active, asserts a signal 308 in a first state for a predetermined period of time, referred to as the "isolation time". In one implementation, the isolation time is 100 ms. In one embodiment, the output signal 308 of the isolate circuit 307 during the isolation time is a signal in a low state which is input to the logical AND device 330a. The output of the logical AND device 330a causes the gate 315a to turn off during the isolation time, thereby preventing the waveform generated by the clock pulse generator 305 from being provided to the driver 310a.

Thus, during the isolation time, the driver 310a is not outputting a clock signal. This allows the pull-up resistor 314 and voltage source (Vcc) to pull the state of the clock line which carries the output clock signal 312a to a high state. This high value, caused by the pull-up resistor 314, is input to the buffer 320a, and latched into the latch 325a. The latch 325a is initialized by a reset signal (not shown) internal to the chip and subsequently latches in a high value, thereby providing a signal in a high state to the logical AND device 330a. In one implementation, the internal reset signal is generated by circuitry internal to the generator 305 in response to Vcc rising when the computer system is powered on.

After the isolation time has expired, the isolate circuit 307 deasserts the signal 308. The deassertion of the signal 308 causes the latch 325a to latch and hold the sampled value. In one embodiment, the output signal 308 of the isolate circuit 307 after the isolation time has elapsed is a signal in a high state. The signal 308 is input to the logical AND device 330a. Thus, after the isolation time expires, the output of the logical AND device 330a is the same as the value stored in the latch 325a.

Thus, once the high state is latched into the latch 325a and the isolation time has expired, the gate 315a turns on and the driver 310a provides the clock signal 312a based on the waveform received from the clock pulse generator 305. It should be noted that the oscillation of the output clock signal 312a does not affect the gate 315a because the high value has already been stored in the latch 325a.

In one embodiment, the pull-up resistor 314 is a large value resistor so as not to affect the oscillating clock signal output by the driver 310a. In one implementation, the pull-up resistor 314 is a 10k ohm resistor In one embodiment of the present invention, the latch 325a is controlled (also referred to as "clocked") by the output signal 308. The signal 308 is asserted by the isolate circuit 307 at the expiration of the isolation time, and causes the latch 325a to latch in whatever value is being input to the latch 325a from the buffer 320a at that time. The latch 325a is not clocked again until the end of another isolation time (e.g., due to the reset signal 306 being asserted again). Thus, whatever value is latched into the latch 325a continues to keep the gate 315a turned on.

As shown in FIG. 3, the output clock signal 312b is tied to a ground 313 (analogous to output clock signal 212b discussed above with reference to FIG. 2). Thus, during the isolation time, the ground 313 pulls the line which carries the output clock signal 312b to a low state. This low signal, caused by the ground 313, is input to the buffer 320b, and then stored in the latch 325b. Then, when the isolation time expires, the output of the logical AND device 330b causes the gate 315b to turn off.

In one embodiment of the present invention, the latch 325b is clocked by a signal from the isolate circuit 307, analogous to the discussion above regarding latch 325a.

Thus, the clock synthesizer 300 provides an isolation time which allows the latches 325 to store the correct values identifying whether a component is connected to the output clock signal 312. After this isolation time has expired, the values stored in the latches 325 control whether the gates 315 are turned on or turned off, and thus which of the drivers provide clock signals.

In one embodiment of the present invention, the pull-up resistor 314 is part of the circuit board on which the clock synthesizer 300 is to be mounted (e.g., circuit board 110 of FIG. 1). In alternate embodiments, the pull-up resistor 314 can be part of the clock synthesizer 300 or can be incorporated into the components which are to receive the clock signals from the clock synthesizer 300.

It is to be appreciated that the pull-up resistor 314 can be replaced with other conventional pull-up devices to achieve the same function.

Figure 4:
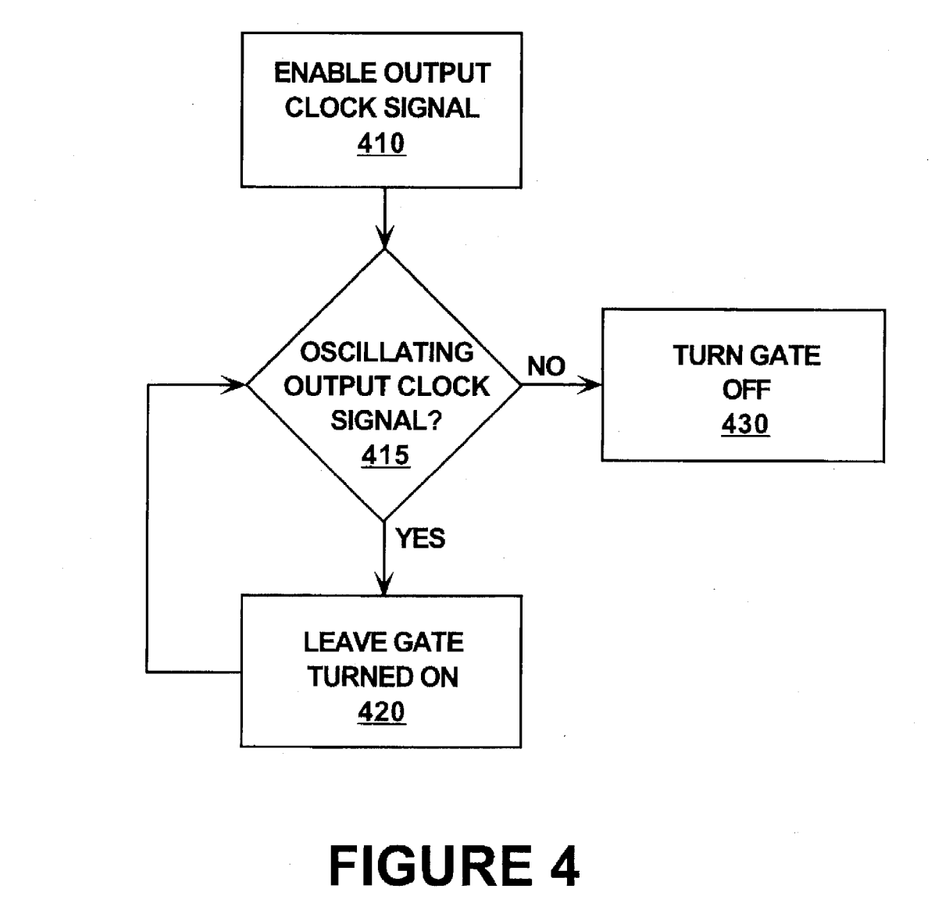
FIG. 4 is a flowchart showing the steps for automatically enabling or disabling a clock signal according to one embodiment of the present invention.

FIG. 4 is a flowchart showing the steps for automatically enabling or disabling a clock signal according to one embodiment of the present invention. The steps of FIG. 4 are discussed with reference to one output clock signal, however, it is to be appreciated that these steps apply equally to all of the clock signals which can be output by the clock synthesizer. In one implementation, the steps shown in FIG. 4 correspond to the logic shown in the diagram of FIG. 2.

First, when the computer system is powered on, the output clock signal is enabled, step 410. The output clock signal is enabled by enabling the driver via the enable signal, and by turning on the gate coupled to the input of the driver. In step 415, if the output clock signal is oscillating then the oscillation sensing circuitry operates to leave the gate turned on, thereby enabling the output clock signal, step 420. However, if the output clock signal is not oscillating then the oscillation sensing circuitry turns off the gate, thereby disabling the output clock signal, step 430.

It is to be appreciated that if at any point during the operation of the computer system the output clock signal changes from an oscillating signal to a non-oscillating signal, then the oscillation sensing circuitry operates to turn the gate off.

Figure 5:
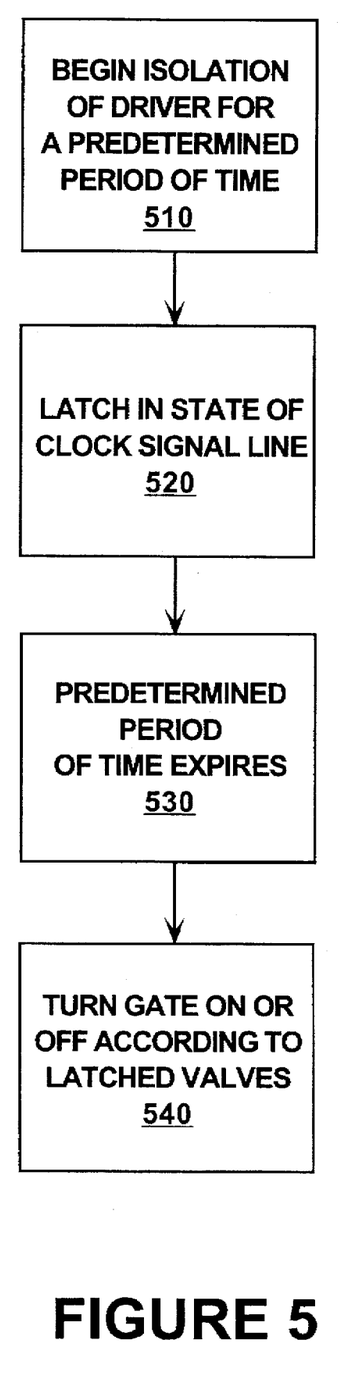
FIG. 5 is a flowchart showing the steps for automatically enabling or disabling a clock signal according to another embodiment of the present invention.

FIG. 5 is a flowchart showing the steps for automatically enabling or disabling a clock signal according to another embodiment of the present invention. The steps of FIG. 5 are discussed with reference to one output clock signal, however, it is to be appreciated that these steps apply equally to all of the clock signals which can be output by the clock synthesizer. In one implementation, the steps shown in FIG. 5 correspond to the logic shown in the diagram of FIG. 3.

First, the isolate circuit 307 begins isolation of the driver and associated circuitry from the clock pulse generator for a predetermined period of time, step 510. This isolation prevents the waveform generated by the clock pulse generator from causing a clock signal to be output by the driver. During this predetermined period of time, the state of the line which carries the output clock signal is stored in the latch, step 520. The predetermined period of time which began in step 510 then expires, step 530. The gate is then turned on or off according to the latched value, step 540.

Thus, during the predetermined period of time begun in step 510, the driver and associated circuitry is initialized to provide an output clock signal only to those components which are actually present in the system.

In one embodiment of the present invention, the clock synthesizer 150 can provide up to three output clock signals having a frequency of either 60 Mhz or 66 Mhz. However, it is to be appreciated that clock synthesizers in accordance with the present invention can provide any number of output clock signals at any of a wide range of frequencies.

It is also to be appreciated that the present invention can be used in conjunction with other energy conservation techniques to further enhance the energy conservation of the system. For example, returning to FIG. 2, all of the drivers could be disabled for a period of time by deasserting the enable signal 230. Then, once the drivers are re-enabled, the present invention would continue to provide only the necessary clock signals, as discussed above.

In the discussions above, the clock synthesizer 200 of FIG. 2 and the clock synthesizer 300 of FIG. 3 are discussed as each including one clock pulse generator which can provide a waveform to all of the drivers. However, it is to be appreciated that alternate embodiments can include multiple clock pulse generators, each of which provides waveforms to different drivers. These waveforms can have the same period, or, alternatively, can have different periods, thereby generating clock signals at different frequencies.

It is also to be appreciated that the embodiments shown in FIGS. 2 and 3 can be combined. For example, the isolate circuit, logical AND devices, and latches can be coupled to some of the drivers, but not all. Thus, the isolate circuit would affect some, but not all, of the drivers. Thus,the present invention prevents unnecessary clock signals from being generated. Any components which are present in the system and which require a clock signal from the synthesizer receive a clock signal as discussed above. And, any clock signal which would be provided to a non-existent component in the system is disabled, thereby reducing the energy consumption, heat generation, and EMI emissions of the system.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. An apparatus for automatically disabling a clock signal, the apparatus comprising:
 a driver to provide the clock signal as an output;
 a gate coupled to the driver;
 a sensing circuit, coupled to both the output of the driver and the gate, to provide a signal to the gate responsive to the output being in a first state; and
 wherein the gate is to prevent the driver from providing the clock signal responsive to the signal from the sensing circuit.

2. The apparatus of claim 1, wherein the first state comprises a nonoscillating state.

3. The apparatus of claim 1, further comprising:
 a generator, coupled to the driver, to provide a waveform to the driver, wherein the driver is to provide the clock signal responsive to the waveform; and
 wherein the gate is to prevent the waveform from being provided to the driver responsive to the signal from the sensing circuit.

4. An apparatus for automatically disabling a clock signal, the apparatus comprising:
 a driver to provide the clock signal as an output;
 a gate electrically connected to the driver;
 a buffer, electrically connected to both the output of the driver and the gate, to provide a signal to the gate in a first state responsive to the output being in a second state, wherein the gate is to prevent the driver from generating the clock signal responsive to the signal from the buffer being in the first state; and
 an isolation circuit, electrically connected to the driver, to prevent the driver from generating the clock signal for a predetermined period of time regardless of whether the signal from the buffer is in the first state.

5. The apparatus of claim 4, further comprising a latch, electrically connected to the buffer and the gate, to store the signal from the buffer.

6. The apparatus of claim 5, further comprising a logical AND device having an output electrically connected to the gate, a first input electrically connected to the isolation circuit, and a second input electrically connected to the buffer so that the buffer is electrically connected to the gate through the logical AND device.

7. A method of controlling a clock signal output, the method comprising the steps of:

(a) enabling a driver, wherein the driver provides the clock signal output;
(b) leaving the driver enabled responsive to the clock signal output oscillating; and
(c) disabling the driver responsive to the clock signal output not oscillating.

8. The method of claim 7, further comprising the steps of:
 providing a waveform to the driver; and
 the driver providing the clock signal output based on the waveform.

9. The method of claim 8, wherein the disabling step (c) comprises the step of preventing the waveform from being provided to the driver.

10. The method of claim 9, wherein the step of providing the waveform to the driver comprises the step of providing the waveform to the driver via a gate, and wherein the step of preventing the waveform from being provided to the driver comprises the step of turning off the gate.

11. A method of controlling a clock signal provided by a signal driver, the method comprising the steps of:
 (a) isolating the driver for a predetermined period of time;
 (b) storing a value indicating whether a clock line which carries the clock signal is in a first state or a second state; and
 (c) after the predetermined period of time has elapsed, providing a waveform to the driver responsive to the clock signal being in the first state.

12. The method of claim 11, wherein the providing step (c) comprises providing the stored value to a gate, wherein the gate is turned on responsive to the stored value being in the first state.

13. The method of claim 11, wherein the first state corresponds to a high state.

14. An apparatus for controlling a clock signal, the apparatus comprising:
 means for providing a waveform to a driver, wherein the driver provides the clock signal;
 means for sensing a state of the clock signal; and
 means for preventing the waveform from being provided to the driver if the clock signal is in a first state.

15. The apparatus of claim 14, further comprising;
 means for isolating the driver from the waveform for a predetermined period of time; and
 means for storing, during the predetermined period of time, a value indicating the state of the clock signal.

* * * * *